Figure 1:
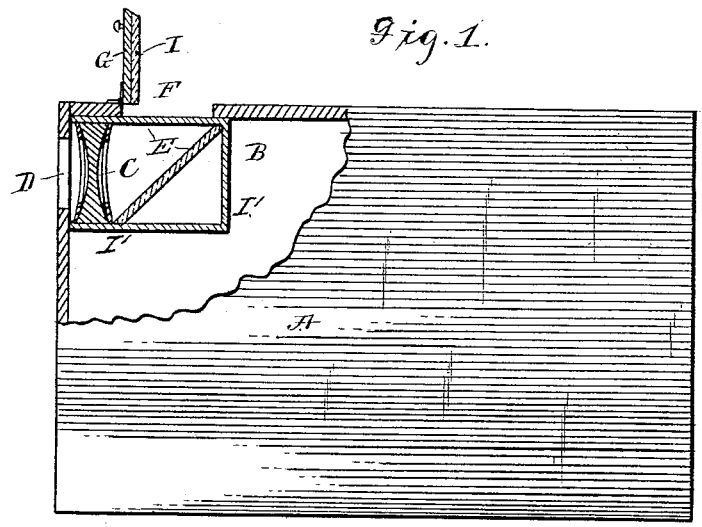

(No Model.)

W. H. LEWIS.
PHOTOGRAPHIC CAMERA.

No. 386,996. Patented July 31, 1888.

Attest.
W. E. Bowen
H. W. Brigham

Inventor
William H Lewis
by Phillips Abbott
his Attorney

United States Patent Office.

WILLIAM H. LEWIS, OF BROOKLYN, ASSIGNOR TO E. & H. T. ANTHONY & COMPANY, OF NEW YORK, N. Y.

PHOTOGRAPHIC CAMERA.

SPECIFICATION forming part of Letters Patent No. 386,996, dated July 31, 1888.

Application filed January 6, 1888. Serial No. 259,999. (No model.)

*To all whom it may concern:*

Be it known that I, WILLIAM H. LEWIS, a citizen of the United States, and a resident of Brooklyn, in the county of Kings and State of New York, have invented certain new and useful Improvements in Photographic Finders, of which the following is a specification.

My invention relates to improvements in the "finder," so called, of photographic cameras, said finders being used more especially in connection with cameras designed for instantaneous photography, usually called "detective cameras;" and, more particularly described, the invention consists in a plano-concave or biconcave finder-lens, as the case may be, provided with diaphragms covering portions of its surface to limit the field thereof, and a mirror or other reflecting-surface placed in rear of the lens and at an angle thereto, upon which the picture in miniature is received.

My invention includes, also, means whereby the finder may be operated when held in an elevated position, and means whereby the center of the desired picture may be found by the finder, and thereby accurately produced in the resulting or final picture.

In the drawings the same reference-letters indicate the same parts in all the figures.

Figure 2:
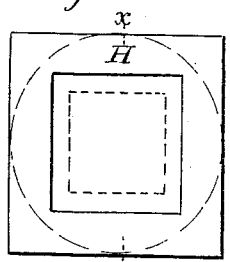
Figure 3:
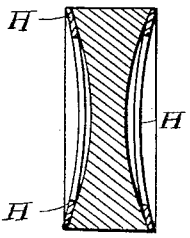
Figure 4:
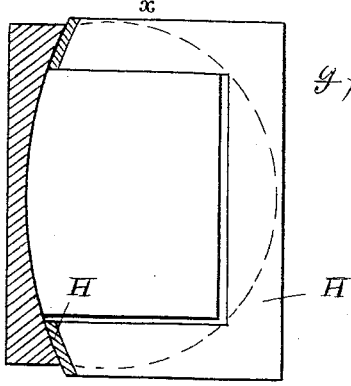
Figure 5:
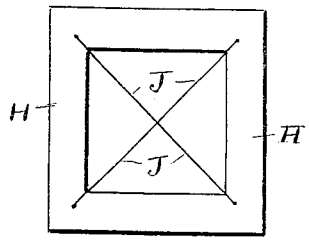

Figure 1 illustrates a vertical longitudinal view of a camera, partly in section, taken through the center of the finder. Fig. 2 illustrates a front view of the finder-lens with the diaphragm in position. Fig. 3 illustrates a section of the lens and diaphragms on the line $x\,x$ of Fig. 2. Fig. 4 illustrates in perspective and partly in section a plano-concave lens with a diaphragm on the inside thereof. Fig. 5 illustrates a diaphragm provided with the centering hair-lines.

A is the camera-box. It may be made in any preferred manner, and is provided with the devices and instrumentalities needful to enable it to serve its purpose. They are well understood by those familiar with this art, and do not require illustration or description herein.

B is the finder. It is placed in the main camera-box, either in an upper corner, as shown, or on a line coincident with the lens of the camera, vertically or horizontally, or at any other point preferred. It consists in a lens, C, either plano-concave or biconcave, as preferred, which is fastened in the camera-box opposite an opening, D, made in it as usual.

E is a mirror or other reflecting-surface placed in rear of the lens C, and set at an angle thereto, preferably at an angle of forty-five degrees or thereabouts. The precise angle, however, is not material.

F is an opening made in the upper side of the camera-box immediately over the mirror. It is provided with a cover, G. On the under side of the cover I attach a mirror, I, which, when the cover is open, will reflect the picture from the main mirror, E. By this means, when the camera is held even so high as the eyes of the user, the finder may be operated by looking over the top of the camera and governing the movement of the camera by the reflected picture seen in the mirror I, and this will be the more readily accomplished because the picture, which is reversed in the mirror E, will be right side up in the mirror I. The angle at which the cover should be during the above-stated operation is substantially parallel with the mirror E, and, if desired, any suitable friction device or a catch may be applied to the cover to enable it to maintain such position as may be desired against the force of gravity.

I prefer that the opening D in the front of the camera-box should be square in outline to conform to that of the picture-receiving plate at the rear of the camera.

H H are diaphragms, made of metal, paper, card-board, or other suitable material, which are recessed or apertured centrally, preferably, but not necessarily, in square form, and they are applied to each side of the lens C, so as to cover such portion thereof as may be necessary to reduce the field of the finder-lens to the same relative size as that of the object-lens of the camera proper. These diaphragms preferably fit close against the lens, one on each side thereof, and one of them is provided with hair-lines J J, which may be made of fine wire, fine thread, or equivalent material. These lines are stretched across the diaphragm, preferably cornerwise, although they may be attached to the sides of the diaphragm, and they are so arranged that they intersect each other at the central part of the field of the finder-lens. It is of course obvious that if these intersecting lines are coincident with the object which it is intended shall be the central object or figure in the picture when taken this result will follow, because the field of the finder-lens and that of the main plate are coincident.

As before stated, the finder-lens may be plano-concave, as shown in Fig. 4, or biconcave, as shown in Figs. 1 and 3, and the diaphragms H may be placed on one side only of the finder-lens, as shown in Fig. 4. If so, it should be on the inside of the lens, so that the edge of the lens will not be reflected in the mirror, which tends to confuse the picture. I prefer, however, to apply the diaphragms to both sides of the lens, because then the limitation of the picture is more complete and the field of the finder-lens may be made more accurately coincident with that of the object-lens of the camera proper.

The lens, mirror, diaphragms, &c., may be held in place in their relative positions in the camera in any preferred manner. I have found it convenient to inclose them in a little frame by themselves, as shown at I', Fig. 1, which can be bodily fastened in place in the frame of the camera-box in any preferred manner. Moreover, the said devices may be inclosed in a little box by themselves in the end and top whereof the apertures D and F, respectively, are made, and in this case the cover G, with the mirror I, if it be desired, will constitute part of this intact finder, and it is part of my invention to make such intact finders. They may be sold independent of the camera, and may be used in connection with any photographic camera as the purchaser may desire.

Instead of the mirror I being attached to the under side of the cover G, it may be made as a separate attachment. I prefer it attached to the cover, however, and instead of the intersecting hair-lines J being attached to the diaphragm they may be attached to any other suitable support.

It will be seen that by my invention I do away with the ground-glass plate heretofore used in finders, and that I am enabled by the use of the secondary mirror to "find" the picture under circumstances which would be impossible with other finders—as, for instance, to photograph an arrest of a prisoner over the heads of a surrounding crowd, a slight elevation, as from a door-step, being sufficient for the purpose of the operator. Also, by the use of the diaphragm having openings of different sizes I can make the field of the finder-lens coincide with the field of any object-lens which may be in the camera, and that by means of the intersecting hair-lines I can accurately center the picture on the main or picture plate.

Having described my invention, I claim—

1. The combination, with a photographic camera, of a finder consisting of a concave lens and a reflecting-surface placed behind the lens and at an angle thereto, and apertures in the camera in front of the lens and above the reflecting-surface, the latter provided with a cover having a mirror on its under side, substantially as set forth.

2. The combination, with a photographic camera, of a finder consisting of a concave lens, a diaphragm covering a portion of the lens having a square aperture therein, and a reflecting-surface placed behind the lens and at an angle thereto, and apertures in the camera in front of the lens and above the reflecting-surface, substantially as set forth.

3. The combination, with a photographic camera, of a finder consisting of a concave lens, diaphragms applied over a portion of the lens, a reflecting-surface placed behind the lens and at an angle thereto, and apertures in the camera, one in front of the lens and another above the reflecting-surface, the latter being provided with a cover having a mirror on its under side, substantially as set forth.

4. The combination, in a finder for photographic cameras, of a concave lens, a mirror placed behind the lens and at an angle thereto, and hair-lines or their equivalent to determine the center of the picture, substantially as set forth.

5. The combination, in a finder for photographic cameras, of a lens, a diaphragm covering portions of the lens, hair-lines or their equivalent which intersect at or near the center of the lens, a mirror placed behind the lens and at an angle thereto, an aperture in the camera in front of the lens and another over the mirror, and a cover for said last-named aperture provided with a mirror on its under side, substantially as and for the purpose set forth.

6. A finder for photograhic cameras, comprising a finder-box complete in itself when separate from the camera, made substantially as described and shown, and having an opening at one end and another at the top provided with a cover, a concave lens, a reflecting-surface behind the lens set at an angle thereto, and another reflecting-surface arranged on the under side of the cover, substantially as set forth.

7. A finder for photographic cameras, comprising a finder-box complete in itself when separate from the camera, made substantially as shown and described, and having an opening at one end provided with a lens and another at the top, and two reflecting-surfaces, the first arranged to receive the image from the lens and the other to receive it from the first by reflection, substantially as set forth.

Signed at New York, in the county of New York and State of New York, this 24th day of December, A. D. 1887.

WILLIAM H. LEWIS.

Witnesses:
PHILLIPS ABBOTT,
A. T. BRIGHAM.